United States Patent
Cohen et al.

(10) Patent No.: US 8,524,826 B2
(45) Date of Patent: Sep. 3, 2013

(54) TRANSPARENT CHEMICAL RESISTANT IMPACT ACRYLIC ALLOY

(75) Inventors: Leslie A. Cohen, Langhorne, PA (US); Florence Mehlmann, King of Prussia, PA (US)

(73) Assignee: Arkema France, Colombes (FR)

( * ) Notice: Subject to any disclaimer, the term of this patent is extended or adjusted under 35 U.S.C. 154(b) by 325 days.

(21) Appl. No.: 12/918,211

(22) PCT Filed: Feb. 4, 2009

(86) PCT No.: PCT/US2009/033021
§ 371 (c)(1),
(2), (4) Date: Aug. 18, 2010

(87) PCT Pub. No.: WO2009/108469
PCT Pub. Date: Sep. 3, 2009

(65) Prior Publication Data
US 2010/0324218 A1    Dec. 23, 2010

Related U.S. Application Data

(60) Provisional application No. 61/031,102, filed on Feb. 25, 2008.

(51) Int. Cl.
*C08L 27/16*    (2006.01)

(52) U.S. Cl.
USPC .......................................... 524/520

(58) Field of Classification Search
USPC ........................................... 524/520
See application file for complete search history.

(56) References Cited

U.S. PATENT DOCUMENTS

| 4,868,036 | A | 9/1989 | Robinet |
| 5,219,931 | A | 6/1993 | Siol et al. |
| 5,599,863 | A | 2/1997 | Zimmerman |
| 6,624,250 | B2 | 9/2003 | Zimmerman |
| 6,673,873 | B1 | 1/2004 | Zimmerman |
| 6,689,827 | B1 | 2/2004 | Schade et al. |
| 2002/0077430 | A1* | 6/2002 | Zimmerman ................. 525/420 |
| 2007/0178325 | A1 | 8/2007 | Edgecombe et al. |
| 2007/0185270 | A1* | 8/2007 | Arndt et al. .................. 525/199 |
| 2008/0293837 | A1 | 11/2008 | Toft et al. |

FOREIGN PATENT DOCUMENTS

WO    WO 2007064529   A2 *   6/2007

* cited by examiner

*Primary Examiner* — Ling Choi
*Assistant Examiner* — Lanee Reuther
(74) *Attorney, Agent, or Firm* — Thomas F. Roland

(57) ABSTRACT

The invention relates to acrylic alloy compositions that are transparent and have excellent chemical and impact resistance. The acrylic alloy is especially useful in bio-pharmaceutical and medical applications in which the composition needs a resistance to isopropyl alcohol, lipids and impact. The acrylic alloy containing is a melt blend of a high molecular weight acrylic copolymer, polyvinylidene fluoride, optional impact modifier and other additives.

13 Claims, No Drawings

TRANSPARENT CHEMICAL RESISTANT IMPACT ACRYLIC ALLOY

REFERENCE TO RELATED APPLICATION

This application claims priority to PCT/US09/33021 filed Feb. 4, 2009, and to US Provisional Application Ser. No. 61/031102 filed Feb. 25, 2008.

FIELD OF THE INVENTION

The invention relates to acrylic alloy compositions that are transparent and have excellent chemical and impact resistance. The acrylic alloy is especially useful in bio-pharmaceutical and medical applications in which the composition needs a resistance to isopropyl alcohol, lipids and impact. The acrylic alloy containing is a melt blend of a high molecular weight acrylic copolymer, polyvinylidene fluoride, optional impact modifier and other additives.

BACKGROUND OF THE INVENTION

Acrylic compositions and articles made from them are well known for their clarity, sparkling color, and surface gloss. Acrylic materials also tend to have low impact strength or brittleness, and have marginal chemical resistance to medical/bio-pharmaceutical agents.

Plastic materials have found use in medical and biopharmaceutical applications. These applications require transparency, a high level of impact resistance, as well as chemical resistance to lipids and solvents—in particular isopropyl alcohol. The chemical resistance is generally tested with the material under strain. The plastics must also flow well at normal processing temperatures, to form articles. The plastic articles may be reusable (sterilizable) or single use articles.

Copolymers of acrylics with styrene have been used in medical and biopharmaceutical applications. The styrene allows for material that can easily flow during processing, as well as contributing to the chemical resistance.

U.S. Pat. No. 5,2219,931 describes blends of polyvinylidene fluoride (preferably 4-50 wt. %) with core-shell acrylic copolymers (preferably 50-96 wt %) to produce solvent-resistant thermoplastically processible polymer mixtures. The reference describes acrylic polymers that are highly crosslinked, and not uncrosslinked methyl methacrylic polymers.

U.S. Pat. No. 6,689,827 describes transparent impact-resistant thermoplastic molding materials in which the matrix polymer is a blend of a methylmethacrylate/acrylate and styrene/acrylonitrile copolymers.

WO 2007/064529 describes capstock compositions containing low levels of polyvinylidene fluoride. The reference fails to recognize the need for flow-aids when processing high molecular weight acrylic compositions.

Polyvinylidene fluoride polymers have been used to modify acrylic polymers, as described in U.S. Pat. No. 4,868,036 having from 10 to 45 weight percent of polyvinylidene fluoride polymer; and in US 2007/0185270 having 30-95% by weight of fluoropolymer.

U.S. Pat. No. 5,599,863 describes the use of selected polyalkylene glycols in addition to butylated hydroxyl toluene to improve the gamma radiation sterilization of acrylic polymers.

There is a need for an all-acrylic thermoplastic material, having no styrene or other comonomers, that can meet the performance standards in today's medical and biopharmaceutical applications. The main criteria are a high solvent resistance (isopropyl alcohol) and lipid resistance. The lipid resistance includes resistance to the more aggressive lipids often found in home-use applications, i.e.—for cancer drugs. The composition must also have good process flow properties, to form intricate parts. For example, the newest generation of oncology (cancer) drugs uses lipids as a carrier to introduce the drug into the body. The most current lipid resistant polycarbonates were upgraded to meet the increasing demand for lipid emulsions to administer non-water soluble pharmaceuticals. But according to medical device manufacturers these PC grades are still deficient in their performance.

Surprisingly, it has been found that a relatively high molecular weight all-acrylic copolymer matrix, blended with a small amount of polyvinylidene fluoride (PVDF) and other additives, can provide the required chemical resistance, clarity, and flow to meet the industry requirements for a transparent plastic material. Prior art does not mention an acrylic copolymer that both improves melt processing behavior while not harming chemical resistance of an impact acrylic formulation. We have developed a transparent impact acrylic alloy medical grade polymer that offers exceptional chemical resistance while retaining the desirable properties of-a non-styrenic based acrylic impact thermoplastic material.

SUMMARY OF THE INVENTION

The invention relates to a transparent acrylic alloy composition comprising:
a) from 80 to 96 weight percent of an acrylic copolymer composition matrix comprising an acrylic copolymer having a weight average molecular weight of greater than 100,000 g/mol, wherein said acrylic copolymer comprises from 90 to 99.5 weight percent of methylmethacrylate monomer units, and from 0.5 to 10 weight percent of $C_{1-4}$ alkyl acrylate or alkyl methacrylate monomer units;
b) from 3 to 15 weight percent of a low molecular weight polyalkyl(meth)acrylate processing aid
c) from 0 to 3 weight percent of polyethylene glycol
d) from 1 to 5 weight percent of polyvinylidene fluoride, the total adding to 100 percent.

The acrylic copolymer composition matrix may be an impact modified acrylic copolymer.

DETAILED DESCRIPTION OF THE INVENTION

The all-acrylic alloy composition of the invention is a high molecular weight acrylic copolymer, which may optionally be an impact modified acrylic copolymer, blended with 2 to 5 weight percent of a polyvinylidene fluoride polymer, and flow improvers. The specific composition provides a balance of melt processing behavior and chemical resistance.

The acrylic copolymer composition matrix of the invention is composed of an acrylic copolymer and optionally one or more impact modifiers.

The acrylic copolymer makes up 80 to 96 weight percent of the acrylic alloy. The acrylic copolymer is a high molecular weight copolymer, having a weight average molecular weight of greater than 100,000, and preferably greater than 125,000, and less than 400,000, preferably less than 250,000.

The acrylic copolymer of the invention is preferably a copolymer or terpolymer formed from 90 to 99.5 weight percent, and preferably 95 to 99.5 weight percent of methylmethacrylate monomer units; and from 0.5 to 10 weight percent, and preferably 0.5 to 5 weight percent of alkyl methacrylate and/or alkyl acrylate monomers. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Small levels of multifunctional monomers as crosslinking agents may also be used as long as the they do not adversely effect the processing behavior of the polymer. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like.

The copolymer may be block or random, of any architecture, with a random copolymer being preferred.

A preferred acrylic copolymer matrix is a random copolymer containing 95 to 99.5 weight percent of methylmethacrylate monomer units, and 0.5 to 5 weight percent, and more preferably 0.5 to 4 weight percent of alkyl acrylate monomer units. In one embodiment the copolymer is a random copolymer having 97 to 99.5 weight percent of methylmethacrylate monomer units and 0.5 to 3 weight percent of ethyl acrylate monomer units.

Optionally, one or more impact modifiers can be dispersed within the acrylic copolymer composition. If present in the alloy, the impact modifiers make up from 10 to 66 weight percent, preferably from 30 to 60 weight percent, and more preferably at from 40 to 55 weight percent. The acrylic copolymer makes up from 30 to 70 weight percent of an impact modified acrylic composition matrix. In a preferred embodiment, the non-crosslinked portion of the impact modifier is all-acrylic. The impact modifier could have either a core-shell structure or could be one or more block copolymers. Preferred impact modifiers are core-shell multi-layer polymers and block copolymers having at least one hard and at least one soft block. The core-shell (multi-layer) impact modifiers could have a soft (rubber or elastomeric) core and a hard shell; a hard core covered with a soft elastomeric-layer, and a hard shell; or other core-shell morphology known in the art. The rubber layers are composed of low glass transition (Tg) polymers, including, but not limited to, butyl acrylate (BA), ethylhexyl acrylate (EHA), butadiene (BD), BD/styrene, butylacrylate/styrene, and many other combinations. In a preferred embodiment, the impact modifier is a core-shell modifier having a butyl acrylate core. In one embodiment the core shell impact modifier is a four-stage impact modifier based on butyl acrylate.

In another embodiment, the impact modifier is an all-acrylic block copolymer. The block copolymer could be linear, branched, star, comb or have any other polymer architecture. The block could be a di-block, tri-block, or contain multiple blocks. The block copolymer can be formed by a controlled radical polymerization (CRP) process. An advantage of a block copolymer is that, it can improve the melt flow characteristics, as compared with a core-shell impact modifier, and not adversely effect clarity. Examples of useful block copolymers can be found in U.S. 60/762,655 (WO 07/89452) incorporated herein by reference. In one embodiment a butyl acrylate/methylmethacrylate/butyl acrylate triblock copolymer formed by a controlled radical polymerization process is added to the alloy composition for improved chemical resistance, melt flow, and impact without adversely effecting optics.

In addition to the acrylic copolymer and impact modifiers, the acrylic alloy of the invention contains 1 to 5 weight percent, preferably 2 to 5 weight percent, and most preferably from 2-4 weight percent of a polyvinylidene fluoride polymer. The polyvinylidene fluoride polymer is preferably a homopolymer, but could also be a copolymer or terpolymer having at least 80 weight percent of vinylidene fluoride monomer units and 0.5 to 20 weight percent of other copolymerizable fluoromonomers, selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride.

The polyvinylidene fluoride polymer can be utilized to match the refractive index of the multi-stage impact modifier and the acrylic matrix to produce a transparent product with relatively low haze. This would be an improvement over the polymethylmethacrylate/styrene copolymers with MBS impact modifiers of the art. The polyvinylidene fluoride also allows for lower temperature processing conditions, and provides improved toughness for improved chemical resistance under strain, and improved sheer thinning behavior under melt processing conditions. While not being bound by any particular theory, it is believed that the polyvinylidene fluoride leads to improved chemical resistance due to its fluorinated chemical structure.

The transparent acrylic alloy of the invention also includes one or more melt-processing aids to provide acceptable melt flow characteristics. Useful melt processing aids are those known in the art for impact modified acrylic, and include, but are not limited to, low molecular weight poly(alkyl)methacrylate copolymers and polyalkyl glycols.

Low molecular weight polyalkyl(meth)acrylate copolymers, include polymers having two or more acrylic monomers, including copolymers and terpolymers. The polyalkyl (meth)acrylate copolymers are present in the alloy of the invention at from 3 to 15 weight percent, preferably from 5 to 12 weight percent. In one embodiment, the acrylic copolymer is a poly(butyl methacrylate/methylmethacrylate) copolymer. This copolymer was found to impart improved melt processing without hurting chemical resistance and optical properties.

Polyalkyl glycols, such as polyethylene glycol and polypropylene glycol may optionally be used as additional melt processing aids. The polyalkyl glycols are present in the alloy of the invention at from 0 to 3 weight percent. One preferred polyalkylglycol is polyethylene glycol (PEG 3500), which also imparts improved melt processing without adversely effecting chemical resistance and optical properties. In one embodiment, the transparent acrylic alloy composition is free of any polyalkyl glycol. In another embodiment the composition is free of polyethylene glycol.

Other adjuvants may also be present in the acrylic alloy composition at levels of less than 2 weight percent. Some useful adjuvants include, but are not limited to: lubricants, gamma radiation stabilizers, antioxidants, dyes, and colorants. One useful lubricant is stearyl alcohol, which in one embodiment is used at a level of 0.5 weight percent. Gamma radiation stabilizers, as known in the art, can be used to decrease the effect of sterilizing radiation on the yellowing, and recovery from yellowness of the alloy composition. For example, in one embodiment butyl lactate is used at from 0.5 to 1 weight percent. Anti oxidants, such as Irganox 126, can also be present to reduce yellowing of the composition under melt processing conditions.

The different components of the alloy composition can be blended by any means known in the art. Melt blending, including extrusion blending, is especially preferred. The components can be blended in any order.

The transparent acrylic alloy composition of the invention offers exceptional chemical resistance while retaining the desirable properties, such as lower haze, higher light transmittance, lower birefringence, good mechanical properties, and other benefits over acrylic/styrene based medical grade acrylics in the art. The light transmittance of the alloy of the invention is greater than 80 percent, and preferably greater than 85 percent, as determined by a Hunterlab colorimeter D25 model using ASTM E1331 and ASTM E1164. The haze level is less than 10 percent, and preferably less than 5 percent as determined by ASTM D1003. In addition to lower haze these acrylic alloy polymers should demonstrate superior weatherability and non-yellowing characteristics under UV and indoor lighting in addition to sterilizability under gamma irradiation or ethylene oxide gas. This material also demonstrates improved chemical resistance under strain versus competitive P(MMA/S)/MBS impact polymers.

The transparent acrylic alloy of the invention can be used in many applications. Due to the transparency, and solvent (isopropyl alcohol) and lipid resistance of the alloy, it is especially useful in medical and bio-pharmaceutical applications. In addition to medical uses, the improved chemical resistant impact acrylic alloy composition could be used in other applications where clarity and chemical resistance are important, such as, but not limited to, appliances, refrigerator bins, dishwashability items, toys, pools and spas, etc.

EXAMPLES

The ingredients in Table 1 (acrylic matrix, PVDF, impact modifier, lubricant, anti-oxidant, and any other ingredients) were extrusion blended in an American Leistritz twin-screw extruder, with extrusion conditions as the following: T=220-235° C., average die pressure around 400 psi, screw speed around 300 rpms. Lab extruder production rate is around 5 pounds per hour.

TABLE 1

| Ingredient | Weight Percentage range |
| --- | --- |
| PLEXIGLAS Q-clean | 35-45 |
| KYNAR 710 | 2-5 |
| Impact Modifier, 4-stage BA based (Arkema Inc.) | 40-50 |
| Paraloid B60 (Rohm and Haas) | 5-15 |
| PEG3350 | 0-2 |
| Stearyl alcohol | 0.5 |
| Butyl Lactate | 0.9 |

What is claimed is:

1. a transparent acrylic alloy composition comprising:
    a) from 80 to 96 weight percent of an acrylic copolymer composition matrix comprising 1) from 30 to 70 weight percent of an acrylic copolymer having a high weight average molecular weight of greater than 125,000 g/mol, wherein said acrylic copolymer comprises from 90 to 99.5 weight percent of methylmethacrylate monomer units, and from 0.5 to 10 weight percent of $C_{1-4}$ alkyl acrylate or alkyl methacrylate monomer units, and 2) from 10 to 60 weight percent of one or more impact modifiers; wherein the impact modifier is a core-shell impact modifier
    b) from 3 to 15 weight percent of a low molecular weight polyalkyl(meth)acrylate copolymer melt flow processing aid, having a molecular weight of less than 100,000 g/mol,
    c) from 0 to 3 weight percent of polyethylene glycol,
    d) from 1 to 5 weight percent of polyvinylidene fluoride, the total adding to 100 percent.

2. The alloy composition of claim 1, comprising 35 to 45 weight percent of said acrylic copolymer.

3. The alloy composition of claim 1, wherein said acrylic copolymer comprises 95-99.5 weight percent of methylmethacrylate monomer units and 0.5 to 5 weight percent of ethylacrylate monomer units.

4. The alloy composition of claim 1, comprising 40 to 50 weight percent of said impact modifier.

5. The alloy composition of claim 1, wherein the core of said impact modifier comprises a butyl acrylate polymer.

6. The alloy composition of claim 1, wherein said impact modifier comprises a block acrylic copolymer formed by a controlled radical polymerization process.

7. The alloy composition of claim 1, comprising 2 to 5 weight percent of said polyvinylidene fluoride.

8. The alloy composition of claim 1, wherein said polyvinylidene fluoride is a homopolymer.

9. The alloy composition of claim 1, wherein said polyvinylidene fluoride is a copolymer.

10. The alloy composition of claim 1, wherein said composition has a light transmission of greater than 80 percent, as determined by a Hunterlab colorimeter D25 model using ASTM E1331 and ASTM E1164.

11. The alloy composition of claim 1, wherein said composition has a haze level of less than 10 percent as determined by ASTM D1003.

12. The alloy composition of claim 1, wherein said composition has a chemical resistance that is at least ten times greater, as measured in time under strain and chemical exposure, than the same impact modified composition without polyvinylidene fluoride (d) and the processing aid (b).

13. The alloy composition of claim 1, wherein said composition contains no polyethylene glycol.

* * * * *